United States Patent
Obernosterer et al.

(10) Patent No.: US 7,522,682 B2
(45) Date of Patent: Apr. 21, 2009

(54) REMOVING BIAS IN A PILOT SYMBOL ERROR RATE FOR RECEIVERS

(75) Inventors: Frank Gerhard Ernst Obernosterer, Bavaria (DE); Peter Christian Gunreben, Bavaria (DE); Rainer Walter Bachl, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 825 days.

(21) Appl. No.: 11/025,666

(22) Filed: Dec. 29, 2004

(65) Prior Publication Data

US 2006/0140256 A1 Jun. 29, 2006

(51) Int. Cl.
*H03D 1/04* (2006.01)
(52) U.S. Cl. ..................................... 375/346
(58) Field of Classification Search ................. 375/346, 375/347
See application file for complete search history.

(56) References Cited

U.S. PATENT DOCUMENTS

| | | | |
|---|---|---|---|
| 6,892,053 B2 * | 5/2005 | Engstrom | 455/63.1 |
| 7,149,538 B2 * | 12/2006 | Lindoff et al. | 455/522 |
| 2001/0036812 A1 | 11/2001 | Engstrom | 455/63 |
| 2005/0185701 A1 * | 8/2005 | George | 375/147 |

OTHER PUBLICATIONS

3GPP TS 25.211 V4.3.0 (Dec. 2001) Technical Specification: 3rd Generation Partnership Project; Technical Specification Group Radio Access Network; Physical Channels and Mapping of Transport Channels Onto Physical Channels (FDD) (Release 4).
International Search Report for EP05257706.1 dated Apr. 5, 2006.

* cited by examiner

*Primary Examiner*—Kevin Y Kim

(57) ABSTRACT

The present invention provides a method and an apparatus for measuring a reception quality on a wireless communication link to a receiver by removing a bias in a plurality of received pilot symbols and obtaining a channel estimate for a channel, such as a wireless propagation channel, after substantially removing the bias. For a receiver, such as a rake receiver disposed in a base transceiver station, a bias removal module may extract a plurality of coefficients from a wireless propagation channel to remove a bias before a detector may receive the plurality of pilot symbols in the data stream to determine an error rate of the received pilot symbols where channel estimation is based on the received pilot symbols. In this manner, a systematic flaw in a link quality measurement based on an error rate of the received pilot symbols may be resolved for wireless communication systems.

21 Claims, 6 Drawing Sheets

REMOVING BIAS IN A PILOT SYMBOL ERROR RATE FOR RECEIVERS

BACKGROUND OF THE INVENTION

1. Field of the Invention

This invention relates generally to telecommunications, and more particularly, to wireless communications.

2. Description of the Related Art

A pilot symbol based channel estimation technique may be used to obtain good and robust channel estimates. Channel estimation is useful in a packet-switched wireless communication system to determine a channel state for a packet. To perform channel estimation and synchronization, pilot symbols are usually embedded in a data stream. These pilot symbols are utilized to obtain an optimal channel estimation performance. The pilot symbols known to a receiver are multiplexed with data symbols for channel estimation.

For channel estimation, given a number of pilot symbols in a packet-based wireless communication system, training may be performed in a packet in the form of pilot symbols, allowing a rapid and accurate estimation of the channel. As an example of such pilot symbols, consider the Institute of Electrical and Electronics Engineers (IEEE) 802.11a standard, where a long pilot symbol is provided as part of a packet preamble for both frequency offset estimation and initial channel estimation.

However, channel estimation is a challenge for providing reliable wireless transmissions. With wideband code division multiple access (WCDMA) wireless communication systems, channel estimation is accomplished by using pilot symbols that are periodically inserted in a data stream of each user. Specifically, channel estimation with pilot symbols requires despreading the pilot symbols for each user and averaging over the pilot symbols within a time slot. For example, the pilot symbols are clustered in the case of the Global System for Mobile Communications (GSM) systems and are spread evenly in the data stream if a pilot symbol assisted modulation is used.

Many mobile communication systems, such as a Universal Mobile Telecommunication System (UMTS), make use of pre-defined pilot symbol sequences to estimate the channel coefficients of a wireless propagation channel in a receiver. The estimation of the channel coefficients is useful to compensate the impact of the wireless propagation channel on a transmitted signal and to allow for the coherent detection of the received symbols. Due to the pilot symbol based channel estimation, the channel estimate may be correlated with the received pilot symbol. To measure the quality of the reception, the receiver may evaluate the number of erroneously detected pilot symbols. In case the channel estimate is correlated to the pilot symbol under consideration, the error rate of the received pilot symbols is artificially reduced. Because of this bias being a difference between the detected pilot symbols over all the possible received pilot symbols and the pre-defined pilot symbols, the pilot symbol error rate may not be a good measure for a reception quality indicating a quality or fidelity of a received signal.

Various methods for estimating a channel based on received pilot symbols are known in the literature. However, the majority of channel estimation methods involve a certain correlation between the received pilot symbols and the corresponding channel estimate. Noise and/or interference may lead to errors in the detection of the pilot symbols, i.e. the receiver detects a pilot symbol, which is different from the pre-defined pilot symbol. The pilot symbol error rate increases if the ratio between signal power and noise plus interference power decreases. Hence, the detection of the pilot symbol error rate may be considered a quality indicator of the reception.

In case the correlation between the channel estimates and the received pilot symbol is not negligible, the observed pilot symbol error rate is biased. As already stated above, most of the conventional channel estimation methods have the aforementioned correlation property. In this case, the noise and interference component in the received pilot symbol impacts the channel estimate in such a way that the probability of detecting the supposedly correct pilot symbol is artificially increased. In turn, the detected pilot symbol error rate is biased towards a lower error rate than the actual pilot symbol error if the channel estimation is not biased. FIG. 2 shows a conventional transmission model 200 without bias removal. The transmission model 200 may be operating on a flat fading channel with a single receive antenna. A pilot symbol error rate bias in the transmission model 200 is not limited to this model, but it also applies to various other kinds of receiver structures. The input to a pilot symbol detector 205 is biased towards the pilot symbol p(k). This bias lowers the perceived pilot symbol error rate, which limits the usability of this measurement as a quality indicator for the reception.

The present invention is directed to overcoming, or at least reducing, the effects of, one or more of the problems set forth above.

SUMMARY OF THE INVENTION

In one embodiment of the present invention, a method is provided for measuring a reception quality on a wireless communication link to a receiver. The method comprises receiving at the receiver a plurality of pilot symbols in a data stream to obtain a channel estimate for a channel, removing a substantial portion of a bias from at least a portion of the plurality of received pilot symbols, and deriving the reception quality for the wireless communication link using the plurality of pilot symbols with the bias substantially removed therefrom.

In another embodiment, a receiver comprises a storage storing instructions to remove a substantial portion of a bias from at least a portion of a plurality of received pilot symbols for measuring a reception quality on a wireless communication link based on an error rate of the plurality of pilot symbols. A detector may be coupled to the storage to receive the plurality of pilot symbols in a data stream to derive the reception quality for the wireless communication link using the plurality of pilot symbols with the bias substantially removed therefrom.

In yet another embodiment, a telecommunication system comprises a base station transceiver that includes a storage storing instructions to remove a substantial portion of a bias from at least a portion of a plurality of received pilot symbols for measuring a reception quality on a wireless communication link based on an error rate of the plurality of pilot symbols. The base station transceiver may further comprise a detector coupled to the storage to receive the plurality of pilot symbols in a data stream to derive the reception quality for the wireless communication link using the plurality of pilot symbols with the bias substantially removed therefrom.

In still another embodiment, an apparatus for measuring a reception quality on a wireless communication link to a receiver comprises means for receiving at the receiver a plurality of pilot symbols in a data stream to obtain a channel estimate for a channel, means for removing a substantial portion of a bias from at least a portion of the plurality of received pilot symbols and means for deriving the reception quality for the wireless communication link using the plurality of pilot symbols with the bias substantially removed therefrom.

BRIEF DESCRIPTION OF THE DRAWINGS

The invention may be understood by reference to the following description taken in conjunction with the accompanying drawings, in which like reference numerals identify like elements, and in which.

Figure 1:
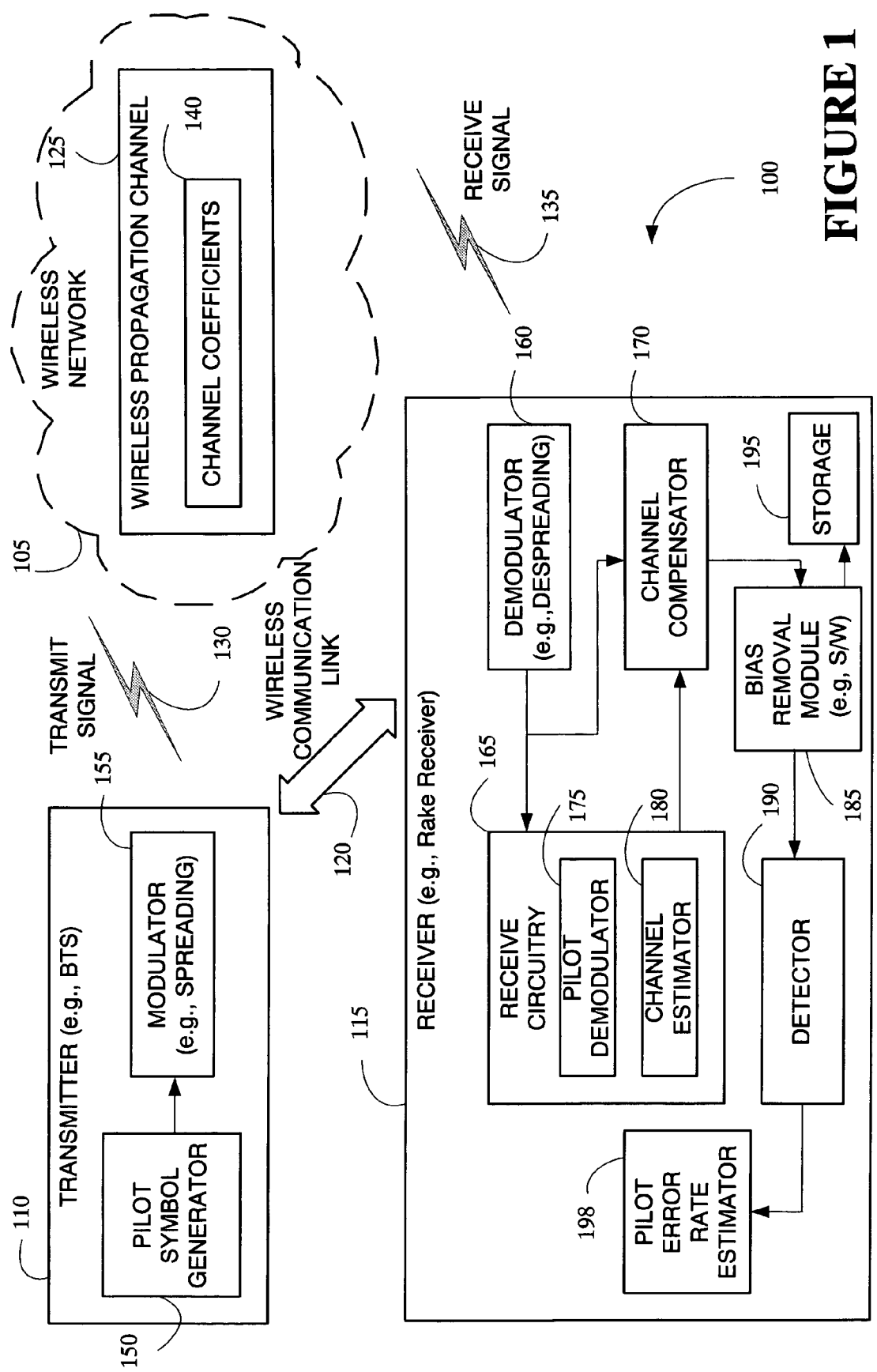
FIG. 1 illustrates a telecommunication system including a wireless network to communicate between a transmitter and a receiver comprising a storage that stores instructions to remove a bias in an error rate of a plurality of pilot symbols for measuring a reception quality on a wireless communication link to the receiver according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and an apparatus are provided for removing a bias in a pilot symbol error rate, which may be used as an indicator for a reception quality on a wireless communication link to a receiver that may be associated with a cellular network in a mobile communication system. In one embodiment, a link quality measurement, i.e., a reception quality on a wireless communication link to a receiver may be measured. The method comprises receiving at the receiver a plurality of pilot symbols in a data stream to obtain a channel estimate for a channel, removing a substantial portion of a bias from at least a portion of the plurality of received pilot symbols, and deriving the reception quality for the wireless communication link using the plurality of pilot symbols with the bias substantially removed therefrom, e.g., a bias-free error rate may be derived to obtain the reception quality for the wireless communication link. A bias removal module extracts a plurality of coefficients from a wireless propagation channel to remove a bias before detecting a number of erroneous detected pilot symbols where channel estimation is based on the plurality of pilot symbols. In this manner, a systematic flaw in a link quality measurement based on an error rate of the received pilot symbols may be resolved.

Referring to FIG. 1, a telecommunication system 100 is illustrated to include a wireless network 105 to communicate between a transmitter 110 and a receiver 115 that removes a bias in an error rate of a plurality of pilot symbols for measuring a reception quality on a wireless communication link 120 to the receiver 115 according to one illustrative embodiment of the present invention. However, the transmitter 110 and the receiver 115 may communicate directly, i.e., in a point-to-point or a peer-to-peer connection between a fixed access point or a node and a mobile wireless communication device. In the case, the wireless network 105 is used; the wireless communication link 120 may be established over a channel, such as a wireless propagation channel 125 using any one of network and communication protocols suitable for a particular application. The wireless propagation channel 125 may provide a designated radio frequency (RF) available for use by the transmitter 110 and the receiver 115. In one embodiment, the reception quality of a receive signal may refer to a relationship including a pre-defined pilot symbols at a receiver input, a channel estimate, a noise power at the receiver input and an interference signal power at the receiver input.

Examples of the telecommunication system 100 include a time division multiple access (TDMA) mobile communication system, a global system of mobile communications (GSM) and a code division multiple access (CDMA) mobile communication system. An example of the transmitter 110 includes a transceiver at a baste station generally called a base transceiver station (BTS, e.g., a NODE-B). Examples of the receiver 115 includes a rake receiver which is a radio receiver having multiple receptors using offsets of a common spreading code to receive and combine several time delayed signals due to multi-path. For instance, in a digital section of a code division multiple access receiver which permits a phone (or a cell) to separate out a relevant signal from all the other signals a rake receiver may receive multiple signals and add the same using multiple fingers where each finger may use a separate phase of a short code and a long code. However, different fingers may track the multiple signals from a same cell or may track separate cells due to a soft handoff. Of course, other receiver structures may be deployed in various embodiment of the present invention without departing from the spirit of the instant invention.

Using the wireless propagation channel 125, the wireless communication link 120 may enable a dedicated communication connection on an end-to-end transmission path having a medium for transferring information in analog and/or digital form. For example, a wireline communication, such as transmission through a cable may be used. The wireless communication link 120 may connect two communication devices, such as a base station and a mobile station in a digital cellular network, and/or it may comprise an electromagnetic transmission, or a combination of both depending upon a specific implementation.

Essentially, by using the designated radio frequency (RF), the transmitter 110 may generate a signal 130 to be transmitted over the wireless communication link 120 through the wireless propagation channel 125. Likewise, the receiver 115 may receive a receive signal 135 in response to the transmit signal 130. Ideally, the transmitted symbols 130 and the received symbols 135 should substantially be same. However, due to undesired noise and interference, an error, such as, a pilot error may be introduced in the transmit signal 130, rendering the receive signal 135 different therefrom. To this end, in one embodiment, the wireless propagation channel 125 of the telecommunication system 100 may include a plurality of channel coefficients 140 characterising the wireless communication link 120.

In one embodiment, the transmitter 110 may comprise a pilot symbol generator 150 to generate the pilot symbols. A modulator 155 may be coupled to the pilot symbol generator 150 in the transmitter 110, e.g. for spreading the symbols of the transmit signal 130. On the other hand, the receiver 115 may comprise, a demodulator 160 to despread the communication data received in the receive signal 135 from the wireless propagation channel 125. The 115 may incorporate receive circuitry 165 coupled to a channel compensator 170. While the receive circuitry 165 may process the despread communication data, the channel compensator 170 may compensate the wireless propagation channel 125. The channel compensator 170 may alleviate a channel distortion due to noise and inter-symbol interference by passing the receive signal 160 through a filter or an equalizer.

Consistent with one embodiment, the receive circuitry 165 may comprise a pilot demodulator 175 coupled to a channel estimator 180. While the pilot demodulator 175 may demodulate the pilot symbols, the channel estimator 180 may obtain a channel estimate for channel coefficients of the wireless propagation channel 125 based on a channel estimation method such that channel estimation is based on the pilot symbols.

The receiver 115 may further include a detector 190 that receives the pilot symbols in a data stream on the wireless propagation channel 125. A storage 195 may store instructions to remove a bias in the error rate of the pilot symbols for measuring a reception quality on the wireless communication link 120 based on the error rate of the pilot symbols. For example, the storage 195 may store a bias removal module 185 (e.g., software (S/W)) for providing an unbiased pilot symbol error rate. A pilot error rate estimator 198 may be coupled to the detector 190 to estimate an error rate of the pilot symbols.

Figure 2:
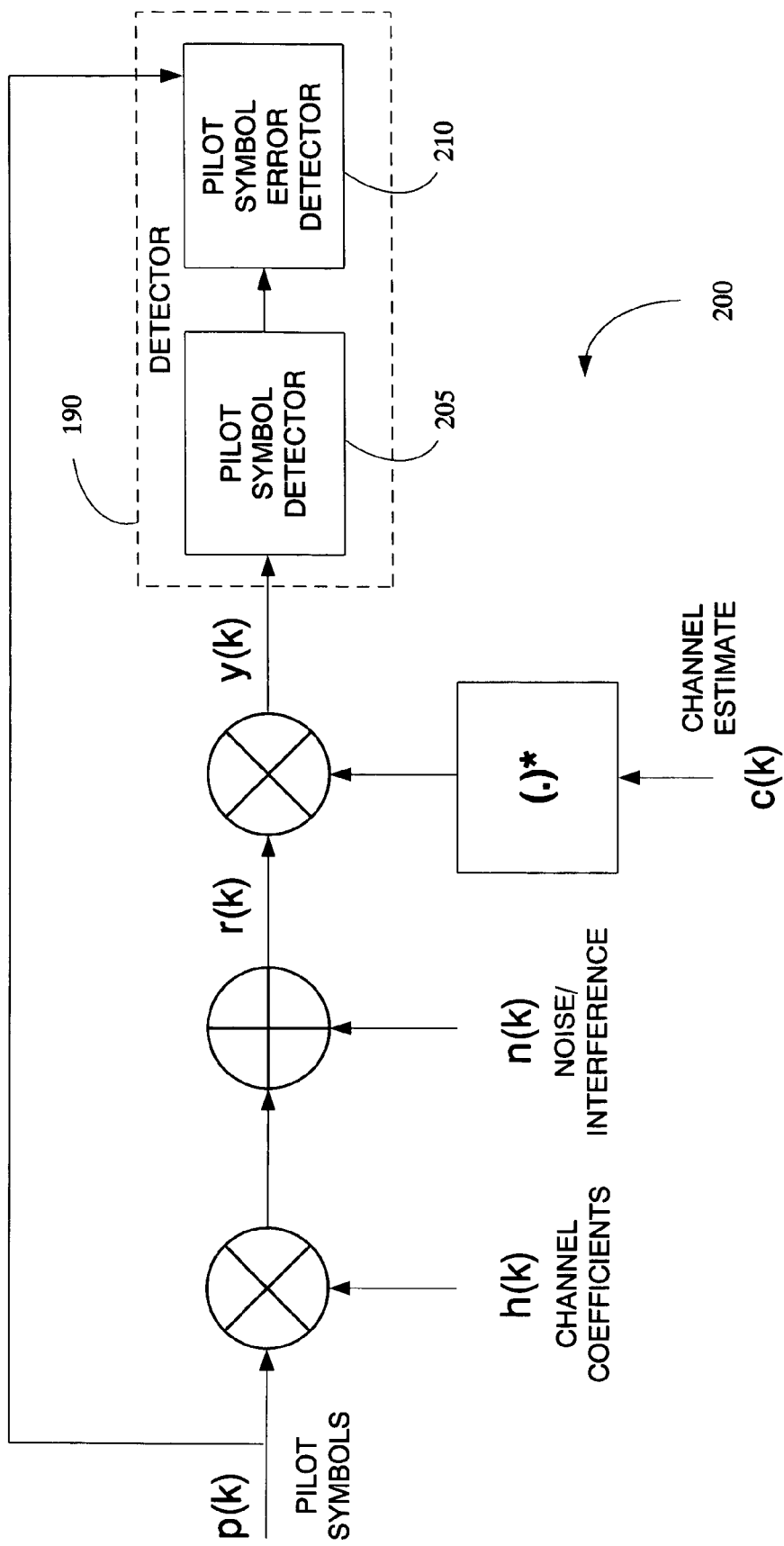
FIG. 2 shows a conventional transmission model without bias removal at the receiver shown in FIG. 1.

Turning now to FIG. 2, a conventional transmission model 200 is shown for illustrating detection of the pilot symbol error rate bias at the receiver 115 shown in FIG. 1. The detector 190 may comprise a pilot symbol detector 205 to detect the pilot symbols and a pilot symbol error detector 210 to detect an error rate of the pilot symbols. The transmission model 200 may operate on the wireless propagation channel 125, such as a flat fading channel with a single receive antenna. The pilot symbols may be received as pilot symbols p(k) at a receiver structure input for the receiver 115. The transmitted pilot symbols p(k) are first multiplied with the channel coefficients h(k) 140 and then added to noise plus interference coefficients n(k) to obtain the received pilot symbols r(k) obtained form the receive signal 135.

In this manner, according to one embodiment, at a time k, the received pilot symbols r(k) may be described by: $r(k)=h(k)p(k)+n(k)$. Since channel estimate c(k) may be correlated to the pilot demodulated received symbol at the time k while neglecting other channel estimation errors, the channel estimate c(k) may be described by: $c(k)=h(k)+\rho(k)\cdot r(k)\cdot p^*(k)$ where $\rho(k)$ indicates a correlation between the channel estimate and the corresponding demodulated received pilot symbol. After channel compensation by the channel compensator 170, an input y(k) at the pilot symbol detector 205 may be given by: $y(k)=r(k)\,c^*(k)=|h(k)|^2\,p(k)+h^*(k)\,n(k)+\rho(k)\,p(k)\,|r(k)|^2$, where a term $\rho(k)\,p(k)\,|r(k)|^2$ represents a bias in the pilot symbols, which introduces a bias in the error rate of the pilot symbols. That is, the input y(k) is biased towards the pilot symbol p(k). Using the bias removal module 185, however, at the receiver 155 based on the transmission model 200, a pilot symbol error rate bias may be eliminated as described below.

Figure 3:
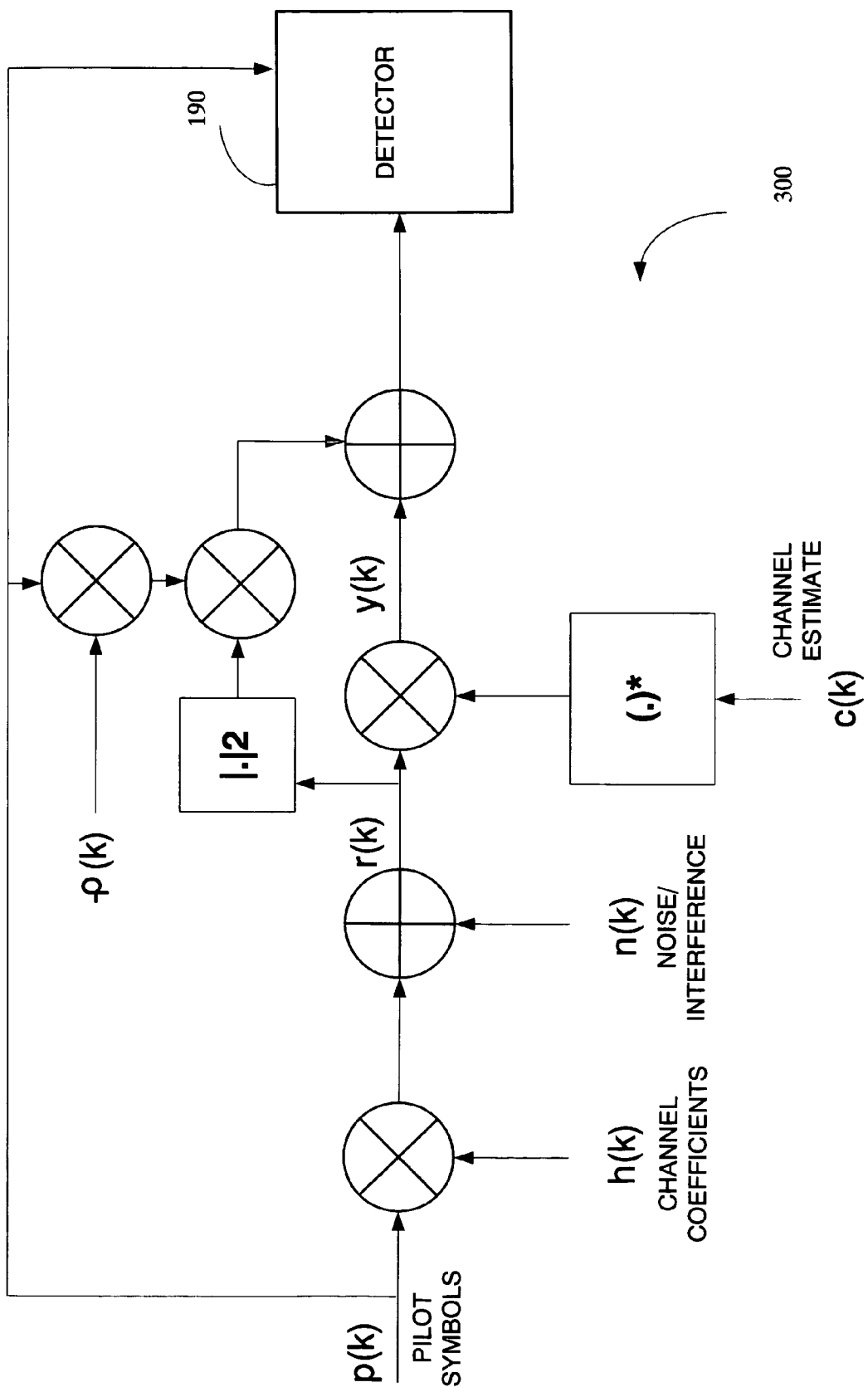
FIG. 3 shows a bias removal transmission model for measuring the pilot symbol error rate bias at the receiver shown in FIG. 1 in accordance with one illustrative embodiment of the present invention.

As shown in FIG. 3, a bias removal transmission model 300 may remove the bias in the pilot symbol error rate at the receiver 115 shown in FIG. 1 in accordance with one illustrative embodiment of the present invention. In the bias removal transmission model 300, the term causing this bias may be removed before detecting the pilot symbols to remove a correlation between the channel estimate and the received pilot symbols. Therefore, for the purposes of removing the bias in the error rate of the pilot symbols, the bias removal module 185 eliminates the term $\rho(k)\,p(k)\,|r(k)|^2$ from the input y(k) at the pilot symbol detector 205. In this manner, by omitting a particular received pilot symbol of the received pilot symbols r(k) when computing the channel estimate c(k) for the particular received pilot symbol an unbiased pilot symbol error rate may be obtained.

Using the channel estimator 180, the bias removal transmission model 300 performs channel estimation of the wireless propagation channel 125 based on the plurality of pilot symbols to determine a plurality of filter coefficients for the channel estimate. In the receiver 115, the pilot symbol detector 190 determines a most likely pilot symbol. Each detected symbol may then be compared against its corresponding well-known symbol and the plurality of erroneous detected symbols may be determined. From this plurality, the pilot symbol error rate may be estimated by the pilot symbol error rate estimator 198. From these filter coefficients, a correlation coefficient $\rho(k)$ may be computed to provide a first input for bias removal in the receiver 115. Alternatively, the correlation coefficient $\rho(k)$ may be measured external to the channel estimate to provide the first input for bias removal in the receiver 115. A second input representing a plurality of predefined pilot symbols p(k) which is known to the receiver 115 may be provided for removing the bias. To remove the bias, a third input representing a received signal r(k) may be provided.

Accordingly, before detecting the plurality of pilot symbols, a composite input signal $\tilde{y}(k)=y(k)-\rho(k)\,p(k)\,|r(k)|^2$ based on the first, second and third inputs described above may be applied in the receiver 115. The composite input signal $\tilde{y}(k)$ may be described by: $\tilde{y}(k)=r(k)\,c^*(k)-\rho(k)\cdot p(k)\cdot |r(k)|^2=|h(k)|^2\,p(k)+h^*(k)\,n(k)$. As can be seen, the composite input signal $\tilde{y}(k)$ does not have the bias mentioned above. Thus, in one embodiment, using the bias removal module 185 to compute the composite input signal $\tilde{y}(k)$ at the pilot error rate detector 190, at the receiver 155 based on the bias removal transmission model 300 the pilot symbol error rate bias may be completely removed.

Figure 4:
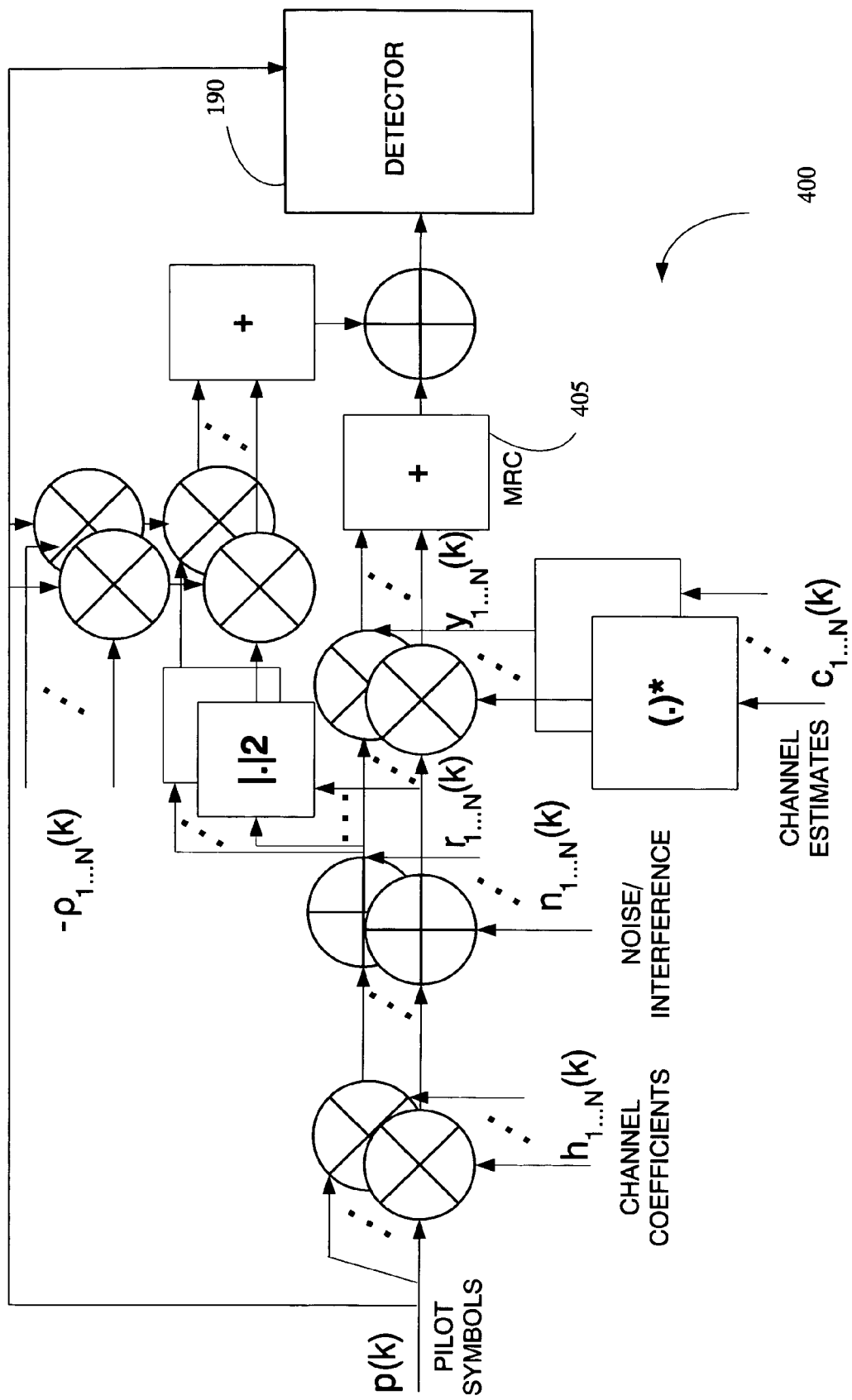
FIG. 4 shows a multi-path and diversity supporting transmission model of a rake receiver structure with N-inputs to a maximum ratio combiner for diversity combining at the receiver shown in FIG. 1 in accordance with one illustrative embodiment of the present invention.

Referring to FIG. 4, a multi-path and diversity supporting transmission model 400 is shown for a rake receiver structure with N-inputs to a maximum ratio combiner (MRC) 405 for diversity combining at the receiver 115 shown in FIG. 1 in accordance with one illustrative embodiment of the present invention. The bias removal module 185 may enable the maximum ratio combiner 405 having a multiplicity of inputs and an output to compute for each input to the maximum ratio combiner 405, a bias removal term or parameter and apply the bias removal term or parameter to the output of the maximum ratio combiner 405. The receiver 115 based on the multi-path and diversity supporting transmission model 400 includes a rake receiver structure.

Figure 5:
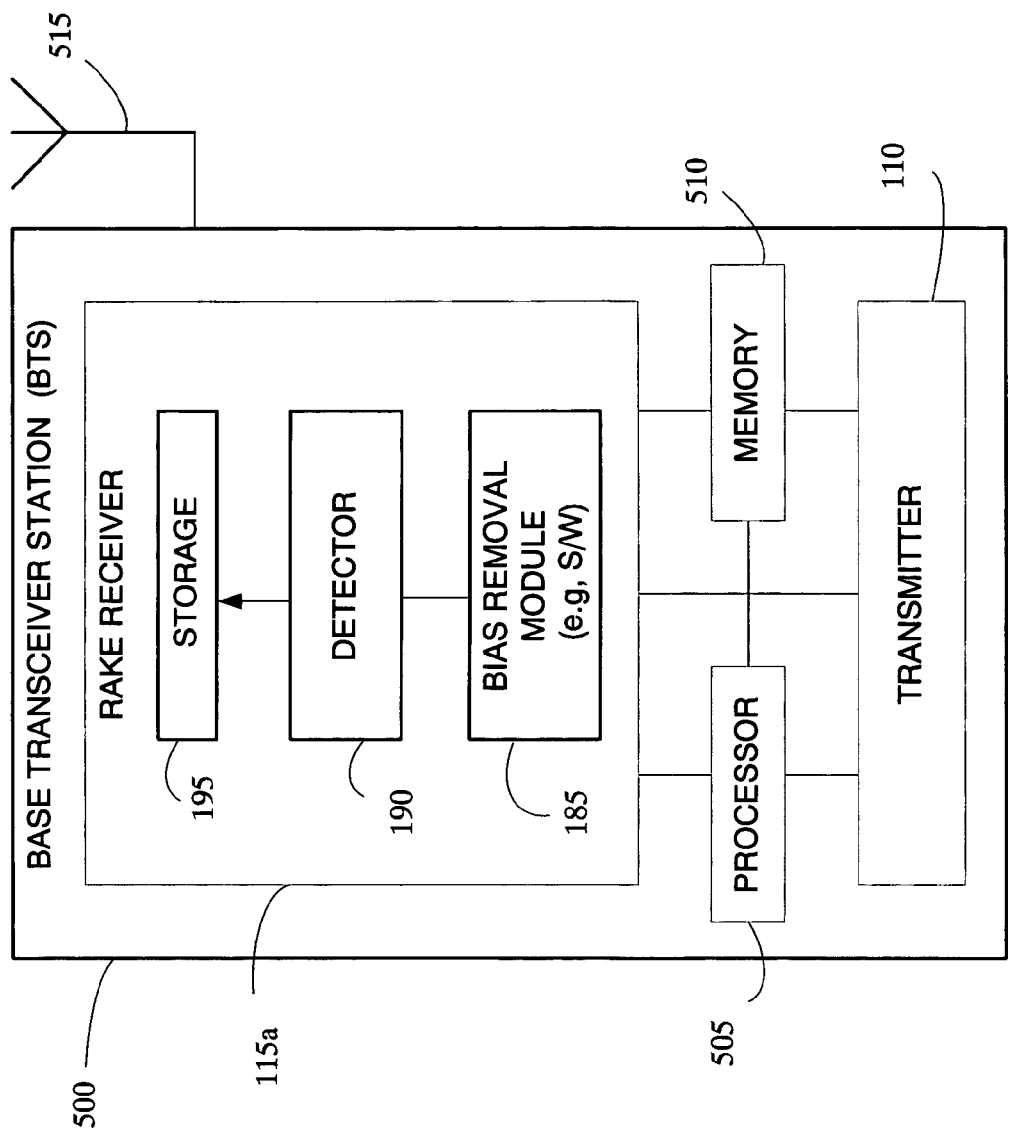
FIG. 5 depicts a base transceiver station (BTS) including the pilot error rate detector shown in FIG. 1 in accordance with one illustrative embodiment of the present invention.

Referring to FIG. 5, a base transceiver station (BTS) 500 is depicted to comprise a rake receiver 115a that includes the pilot error rate detector 190 and the bias removal module 185 stored in the storage 195, as shown in FIG. 1, in accordance with one illustrative embodiment of the present invention. To the rake receiver 115a, the transmitter 110 may be coupled via a processor 505 and a memory 510. The rake receiver 115a may further comprise a receive antenna 515 with diversity combining. Likewise, the rake receiver 115a may additionally comprise a receive structure with multi-path support based on the multi-path and diversity supporting transmission model 400 shown in FIG. 4. In one embodiment, the rake receiver 115a may be defined at least in part by a Universal Mobile Telecommunication System (UMTS) standard.

Figure 6:
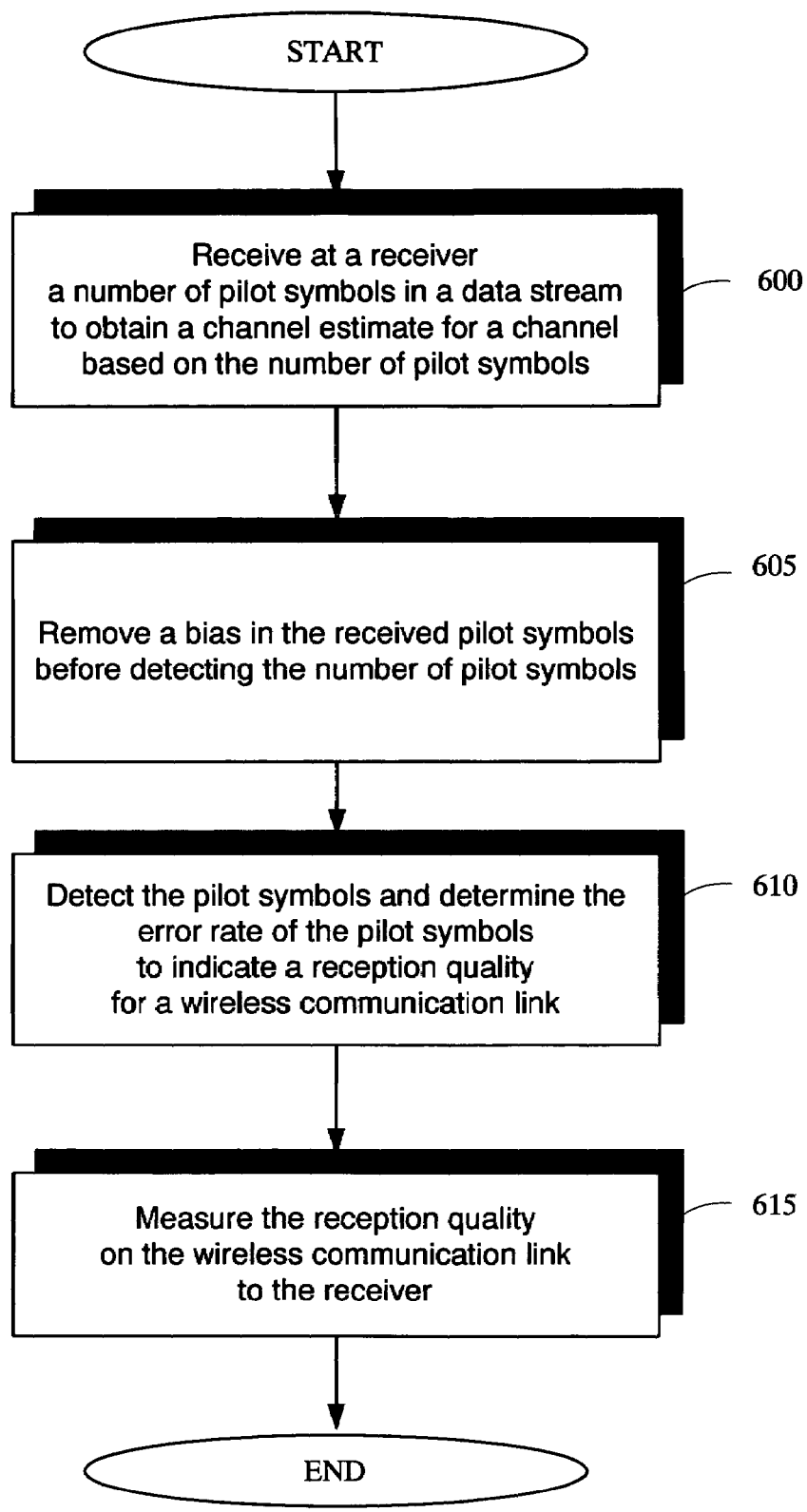
FIG. 6 illustrates a stylized representation of a method for removing a bias in an error rate of a plurality of pilot symbols to measure a reception quality on a wireless communication link to the receiver shown in FIG. 1 according to one illustrative embodiment of the present invention.

Turning to FIG. 6, a stylized representation of a method is illustrated for removing the bias in the error rate of the pilot symbols using the detector 190 and the bias removal module 185 to measure a reception quality on the wireless communication link 120 to the receiver 115 shown in FIG. 1 according to one illustrative embodiment of the present invention. At block 600, the plurality of pilot symbols may be received at the receiver 115 in a data stream from the receive signal 135. From the received pilot symbols the channel estimate c(k) may be obtained for the wireless propagation channel 125. To derive the reception quality for the wireless communication link 120, a bias in the received pilot symbols may be removed before detecting the plurality of pilot symbols, as indicated in block 605. That is, using the composite input signal ŷ(k), a bias in the error rate of the received pilot symbols may be removed before detecting the same. As shown in block 610, the pilot symbols may be detected and an error rate of the received pilot symbols may be determined. At block 615, the reception quality on the wireless communication link 120 to the receiver 115 may be measured. By detecting the plurality of pilot symbols, an error rate of the received pilot symbols may be estimated after substantially removing the bias to derive the reception quality for the wireless communication link, in some embodiments of the present invention.

In one embodiment, with the bias removal, a link quality measurement based on an error rate of pilot symbols of a wireless communication system, such as the telecommunication system 100 may be significantly improved, especially in relatively low rate channel estimation. A systematic flaw in the link quality measurement based on the error rate of the pilot symbols may be resolved, removing the systematic flaw in this measurement.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for measuring a reception quality on a wireless communication link to a receiver, the method comprising:
    receiving at said receiver a plurality of pilot symbols in a data stream to obtain a channel estimate for a channel;
    removing a substantial portion of a bias from at least a portion of said plurality of received pilot symbols, removing said bias before detecting said plurality of pilot symbols; and
    deriving the reception quality for said wireless communication link using said plurality of pilot symbols with said bias substantially removed therefrom.

2. A method for measuring a reception quality on a wireless communication link to a receiver, the method comprising:
    receiving at said receiver a plurality of pilot symbols in a data stream to obtain a channel estimate for a channel;
    removing a substantial portion of a bias from at least a portion of said plurality of received pilot symbols;
    deriving the reception quality for said wireless communication link using said plurality of pilot symbols with said bias substantially removed therefrom
    demodulating said received plurality of pilot symbols while neglecting other channel estimation errors; and
    correlating the channel estimate to said received plurality of pilot symbols to derive an indication of correlation between the channel estimate and said corresponding demodulated received plurality of pilot symbols.

3. A method, as set forth in claim 1, further comprising:
    providing channel estimation for said channel based on said plurality of pilot symbols.

4. A method, as set forth in claim 3, further comprising:
detecting said plurality of pilot symbols to estimate an error rate of said plurality of pilot symbols after substantially removing said bias; and
omitting a particular received pilot symbol of said received plurality of pilot symbols when computing the channel estimate for the particular received pilot symbol to obtain an unbiased pilot symbol error rate.

5. A method, as set forth in claim 3, wherein removing said bias further comprising:
removing a term causing said bias before detecting said plurality of pilot symbols to remove a correlation between the channel estimate and said received plurality of pilot symbols.

6. A method, as set forth in claim 3, wherein removing said bias further comprising:
measuring a correlation coefficient external to the channel estimate to provide a first input for bias removal in said receiver.

7. A method, as set forth in claim 3, wherein removing said bias further comprising:
performing channel estimation of the channel to determine a plurality of filter coefficients for the channel estimate; and
computing a correlation coefficient from said plurality of filter coefficients to provide in said receiver a first input for bias removal.

8. A method, as set forth in claim 6, wherein removing said bias further comprising:
providing in said receiver a second input representing one or more pre-defined pilot symbols for bias removal.

9. A method, as set forth in claim 8, wherein removing said bias further comprising:
providing in said receiver a third input representing a received signal for bias removal.

10. A method, as set forth in claim 9, further comprising:
applying in said receiver a composite input signal based on said first, second and third inputs before detecting said plurality of pilot symbols.

11. A receiver comprising:
a storage storing instructions to remove a substantial portion of a bias from at least a portion of a plurality of received pilot symbols for measuring a reception quality on a wireless communication link based on an error rate of said plurality of pilot symbols said storage storing a bias removal module that extracts a plurality of channel coefficients from said wireless propagation channel to remove said bias before detecting said plurality of pilot symbols; and
a detector coupled to said storage to receive said plurality of pilot symbols in a data stream to derive the reception quality for said wireless communication link using said plurality of pilot symbols with said bias substantially removed therefrom.

12. A receiver, as set forth in claim 11, further comprising:
a channel estimator coupled to said detector to obtain a channel estimate for a channel based on a channel estimation method such that channel estimation is based on said plurality of pilot symbols.

13. A receiver comprising:
a storage storing instructions to remove a substantial portion of a bias from at least a portion of a plurality of received pilot symbols for measuring a reception quality on a wireless communication link based on an error rate of said plurality of pilot symbols;
a detector coupled to said storage to receive said plurality of pilot symbols in a data stream to derive the reception quality for said wireless communication link using said plurality of pilot symbols with said bias substantially removed therefrom; and
a rake receiver, wherein for said rake receiver said storage storing a bias removal module to enable a maximum ratio combiner having a multiplicity of inputs and an output to compute for each input to said maximum ratio combiner a bias removal parameter and apply the bias removal parameter to the output of said maximum ratio combiner.

14. A receiver, as set forth in claim 13, wherein said rake receiver further comprising:
a receive antenna with diversity combining.

15. A receiver, as set forth in claim 13, wherein said rake receiver further comprising:
a receive structure with multipath support.

16. A receiver, as set forth in claim 13, wherein said wireless communication link is a wireless propagation channel.

17. A receiver, as set forth in claim 13, wherein said rake receiver is disposed in a base station transceiver associated with a wireless mobile communication system.

18. A receiver, as set forth in claim 13, wherein said base station transceiver is being defined at least in part by a Universal Mobile Telecommunication System (UMTS) standard.

19. An apparatus for measuring a reception quality on a wireless communication link to a receiver, the apparatus comprising:
means for receiving at said receiver a plurality of pilot symbols in a data stream to obtain a channel estimate for a channel;
means for removing a substantial portion of a bias from at least a portion of said plurality of received pilot symbols comprising means for removing said bias before detecting said plurality of pilot symbols; and
means for deriving the reception quality for said wireless communication link using said plurality of pilot symbols with said bias substantially removed therefrom.

20. An apparatus for measuring a reception quality on a wireless communication link to a receiver, the apparatus comprising:
means for receiving at said receiver a plurality of pilot symbols in a data stream to obtain a channel estimate for a channel;
means for removing a substantial portion of a bias from at least a portion of said plurality of received pilot symbols;
means for deriving the reception quality for said wireless communication link using said plurality of pilot symbols with said bias substantially removed therefrom;
means for demodulating said received plurality of pilot symbols while neglecting other channel estimation errors; and
means for correlating the channel estimate to said received plurality of pilot symbols to derive an indication of correlation between the channel estimate and said corresponding demodulated received plurality of pilot symbols.

21. An apparatus, as set forth in claim 19, further comprising:
means for providing channel estimation for said channel based on said plurality of pilot symbols.

* * * * *